United States Patent [19]

Gismondi et al., deceased

[11] Patent Number: 4,742,113

[45] Date of Patent: May 3, 1988

[54] STRUCTURAL ADHESIVE COMPOSITIONS

[75] Inventors: Thomas E. Gismondi, deceased, late of Erie, Pa., by Joanne Smith, legal representative; Dennis J. Damico, both of Erie, Pa.

[73] Assignee: Lord Corporation, Erie, Pa.

[21] Appl. No.: 16,843

[22] Filed: Feb. 20, 1987

[51] Int. Cl.$^4$ .............................................. C08G 18/30
[52] U.S. Cl. ..................... 524/762; 525/63; 525/123; 528/48; 528/54; 528/75; 528/77; 528/80; 528/85; 528/905
[58] Field of Search ................... 525/63, 123; 528/48, 528/54, 75, 77, 80, 85, 905; 524/762

[56] References Cited

U.S. PATENT DOCUMENTS 3,823,201 10/1976 Pizzini et al. .................. 524/762
4,261,877 4/1981 Vogt et al. ..................... 525/63
4,496,706 1/1985 Chang .......................... 528/54

Primary Examiner—Maurice J. Welsh
Assistant Examiner—S. A. Acquah
Attorney, Agent, or Firm—Larson and Taylor

[57] ABSTRACT

Two pack structural adhesive compositions are disclosed which in addition to exhibiting long pot life and rapid cure possessing exceptional bond strength. The adhesive system comprises a mixture of organic isocyanate, a polymeric polyol comprised of a graft copolymer of poly(alkylene oxide) polyol and acrylonitrile or a acrylonitrile and styrene and a latent catalyst.

16 Claims, No Drawings 4,742,113

STRUCTURAL ADHESIVE COMPOSITIONS

FIELD OF THE INVENTION

This invention relates to structural adhesive compositions. More particularly, the invention is directed to improved two pack structural adhesive formulations of long pot life at room temperature, rapid cure and exceptional bond strength.

BACKGROUND OF THE INVENTION

Two component adhesive system useful as structural adhesive formulations have been described in the patent literature as represented, for example, by U.S. Pat. Nos. 3,706,426; 3,812,003; 3,935,051; 4,097,442; 4,373,082 and 4,444,976. In general, these adhesives comprise a prepolymer compound such as a polyisocyanate and a curative component such as a polyol which are mixed shortly before use. A drawback of the two component adhesive system resides in the fact that the two components must be properly measured and thoroughly mixed just prior to application. Consequently, many in the adhesives industry have turned to one component adhesive systems such as the polyurethane adhesives described in U.S. Pat. Nos. 4,496,706 and 4,515,933.

It is quite common to include a catalyst in both one and two component polyurethane systems to initiate and accelerate the curing of the composition. Most curing catalyst, however, catalyze the reaction of isocyanate and hydroxy compounds not only at elevated temperature but also at room temperature. As a result, attempts have been made to provide stable one component polyurethane adhesive compositions by employing what is commonly referred to in the art as a "latent catalyst", that is, a catalyst which is substantially inactive at room temperature but active at moderately elevated temperatures. Unfortunately, such catalyzed one component polyurethane systems have provided less than satisfactory results in both bonding and stability properties. Normally, attempts to increase bonding strength often result in a loss in stability and vice versa. Moreover, no polyurethane structural adhesives are known which give fiber-tearing bonds to untreated i.e. uncleansed sheet molded compound (SMC). This latter bonding difficulty is attributable to impurities in the SMC, e.g. low molecular weight polyols, mold release agents, etc.) that migrate to the surface thereof and impede bonding unless removed.

It is an object of the invention, therefore, to provide a two component structural adhesive system characterized by a long pot life at room temperature and a very rapid cure at moderately high temperature.

Another object of the invention is to provide an improved two component polyurethane adhesive system which in addition to the aforementioned long pot life and rapid cure rate, possesses improved bonding properties.

Yet another object of the invention is to provide an improved adhesive for sheet molded compound (SMC) bonding which effects a satisfactory bond without treatment or cleansing of the SMC surface.

A further object of the invention is to provide a laminated assembly comprised of a sheet mold compound laminated to a fiber-glass reinforced thermoplastic substrate with the adhesive system of the invention.

SUMMARY OF THE INVENTION

These and other objects of the invention are obtained by a structural adhesive composition comprising:
A. at least one organic polyisocyanate compound having at least two isocyanate groups;
B. a polyol comprising at least one polymeric polyol comprising a graft copolymer of a poly(alkylene oxide) polyol and a vinyl monomer selected from acrylonitrile or a mixture of acrylonitrile and styrene, said polyisocyanate being present in an amount sufficient to provide an NCO:OH ratio of at least 1 with respect to the hydroxyl groups; and
C. a latent catalyst for the reaction of the isocyanate groups of said polyisocyanate and hydroxyl groups of said polyol.

It has been found that the defined graft copolymer in the one component system of the invention not only gives a long pot life at room temperature of over ninety (90) minutes, and full cure in a matter of minutes but unexpectedly high bonding strength to sheet molding compound (SMC). To the inventors' knowledge the adhesive composition is the only two component polyurethane adhesive known that gives fiber tearing bonds to untreated SMC, that is, provide an adhesive strength that results in the substrate failing when an attempt is made to pull apart an assembly bonded together with the adhesive.

Thus, in accordance with another aspect of the invention there is provided a bonded assembly comprising sheet molded compound bonded to a fiber glass-reinforced thermoplastic substrate with the structural adhesive composition of the invention so as to form a laminate.

DETAIL DESCRIPTION OF THE INVENTION

The polymeric polyols of the invention are well known in the art and are obtained by the in situ polymerization of a poly(alkylene oxide) polyol and a vinyl monomer selected from acrylonitrile or a mixture of acrylonitrile and styrene using conventional graft polymerization techniques. The graft copolymer is generated during the polymerization of the vinyl monomer in the polyol and this graft copolymer stabilizes the particles of vinyl polymer as they are formed yielding an extremely stable dispersion of polymer in the polyol. Generally the molecular weight of the polymeric polyol ranges from about 1,000 to 10,000, preferably 2000 to 6000.

The vinyl portion of the graft copolymer of the invention generally comprises about 5 to 50%, preferably 15 to 25% while by weight, the poly (alkylene oxide) polyol portion comprises about 50 to 95% by weight of the graft copolymer. The preferred graft copolymers are those wherein the vinyl portion consists entirely of poly(acrylonitrile). Where styrene-acrylonitrile copolymer is used as the vinyl portion of the graft copolymer, however, the ratio of acrylonitrile to styrene will usually range from 30 to 100:0 to 50. The polymeric polyols of the invention are commercially available from Union Carbide Corporation under the tradename NIAX polyol. ("NIAX" is a registered trademark of Union Carbide Corporation).

The poly(alkylene oxide) polyols having at least two hydroxyl groups which are used to prepare the graft copolymers of the present invention are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 100 to about 4000, preferably about 100 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide)polyols derived from cyclic ethers such as dioxolane, which affords a polyol having the formula $HO(C-H_2OCH_2CH_2O)_nH$, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethylene-ethylene) oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with such polyols having 2 hydroxyl groups being currently preferred. Preferred poly(alkylene oxide polyols are poly(tetramethylene oxide) polyols, poly(propylene oxide) polyols, poly(ethylene oxide-propylene oxide) polyols, and poly(ethylene oxide) polyols. Especially preferred are the poly(ethylene oxide-propylene oxide) polyols.

Another useful group of poly(alkylene oxide) polyols which can be employed in the practice of the invention are poly(alkylene etherthioether) compounds, which compounds have the identical formula as the poly(alkylene oxide) polyols except that some of the ether oxygens have been replaced with sulfur atoms. Such polyols are conveniently prepared by the reaction of a compound such as thiodiglycol with ethylene glycol in the presence of a catalytic amount of p-toluene sulfonic acid. Other polyethers, such as poly(alkylene oxide-arylene ether) polyols may be used.

If desired, substantially any of the known monomeric alcohols having at least two hydroxyl groups, and polymeric non-poly(alkylene oxide) polyols having at least two hydroxyl can be employed as optional ingredient in combination with poly(alkylene oxide) polyols to form the graft copolymers of the invention. Representative monomeric and polymeric polyols and polyesters which can optionally provide up to about 97 mol percent of hydroxyl functionality include 1,4-butanediol; 1,3-butylene glycol; 1,6-hexane diol; cyclohexane diol; 4,4'-methylenebis-(cyclohexanol); glycerol; trimethylolpropane; 1,2,6-hexanetriol; erythritol; pentaerythritol; neopentyl glycol; polycaprolactone diols and triols, poly(butadiene) diols; hydroxylated poly(butadiene) dienes; poly(tetramethylene adipate) diol; poly(ethylene succinate) diol; poly(1,3-butylene sebacate) diol; and (1,3-butylene glycol/glycerine/adipic acid/isophthalic acid) diols and triols. Mixtures of such monomeric and polymeric compounds can be employed.

When employed the monomeric or polymeric (nonpoly alkylene oxide) polyols will normally be present in an amount ranging from 5 to 40% by weight, preferably 5 to 35% by weight of the poly(alkylene oxide) polyol ingredient.

The isocyanate compounds which are employed in forming the unsaturated urethane oligomers in accordance with the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-tri-methylhexamethylene-1,6-diisocyanate, hexamethylene-1,6-diisocyanate, diphenylmethane-4,4'-diisocyanate, triphenylmethane-4,4',4''-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylenebis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a ratio of 1:3, and the like. The diisocyanate compounds are preferred, with 4,4'-methylene-bis(phenol isocyanate) being especially preferred.

The isocyanate-functional prepolymers which are suitable for use in the practice of this invention are well known. Typically, such prepolymers are adducts or condensation products of polyisocyanate compounds having at least 2 free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least 2 free, unreacted isocyanate groups.

The amount of polyisocyanate in the adhesive composition of the invention is that sufficient to provide a NCO:OH ratio of at least 1, preferably 1.5:1 with respect to the hydroxy groups of the polyol ingredient, i.e. the poly(alkylene oxide) polyol alone or the poly(alkylene oxide) polyol in combination with other non-poly(alkylene oxide) polyols.

The "latent" catalyst employed in the adhesive composition of the invention can be any of the catalyst for the reaction of isocyanate groups with hydroxy groups known to be substantially inactive at room temperature but active, that is, causing significant acceleration of the isocyanate-hydroxy group reaction at moderately elevated temperatures as for example, about 150° F. to 200° F. Illustrative of these known latent catalysts are magnesium stearate, cadmium stearate, magnesium acetylacetonate and nickel acetylacetonate. The most effective and preferred latent catalyst, however, are the phenol or acid-blocked salts of tertiary amine at least one bicyclic amidine having the formula:

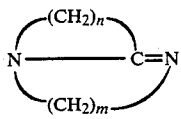

wherein m and n can be the same or different and each is an integer in the range of 3 to 5. The preferred blocked salts of the bicyclic amidines are the acid-blocked salts such as the mineral acid, sulfonic acid or carboxylic acid salts. Particularly preferred are the sulfonic acid salts such as the p-toluene sulfonic salts and the fatty acid salts such as the 2-ethylhexanoic acid salt. The preferred bicyclic amidine compounds are 1,8-diaza-bicyclo [5.4.0] undec-7-ene and 1,5-diaza-bicyclo [4.3.0] non-5-ene.

The concentration of the latent catalyst in the adhesive composition of the invention will depend principally upon the particular isocyanate and polymeric polyol employed but in all cases will be sufficient to catalyst the NCO/OH reaction at moderately elevated temperatures. Ordinarily the concentration will fall in the range of about 0.01 to 10% by weight, preferably 0.1 to 5% by weight, based on the total weight of the adhesive composition.

Formulation of the adhesive composition of the invention can be effected in any desired manner as by simply blending together the ingredients. While the adhesive composition of the invention will most likely find their greatest utility as structural or laminating adhesives for the SMC bonding, i.e. the bonding or lamination of SMC to fiberglass reinforced thermoplastic substrates such as automobile body panels, they are also useful as primers for other SMC-to-SMC adhesives and as adhesives for bonding metal surfaces such as steel, aluminum, copper and plastic to a variety of substrates including metals, solid plastics, fibers, glass, ceramics, wood, and the like; as well as plastic surfaces to the same or dissimilar materials.

The invention is further illustrated by the following example wherein all parts, proportions and percentages are by weight unless otherwise indicated.

EXAMPLE

The following formulation was prepared by mixing together the ingredients identified in the following table in the proportion indicated.

TABLE

| Ingredient | E.W. | EQ. | Weight | Wt. Percent |
|---|---|---|---|---|
| Polymeric-polyol | 1000 | 0.75 | 750.0 | 78.71 |
| Polycaprolactone diol | 266 | 0.25 | 66.5 | 6.98 |
| Poly(methylene diphenyl diisocyanate) | 135.4 | 1.00 | 135.4 | 14.21 |
| p-Toluene sulfonic acid salt of 1,8-diaza-bicyclo[5.4.0] undec-7-ene | | | 1.0 | .10 |
| | | | 952.9 | 100.00 |

The pot life of the adhesive formulation was determined to be more than 90 minutes at room temperature. The adhesive was used to prepare three samples of an assembly of untreated Ashland Phase-Alpha SMC bonded by the adhesive to a glass-fiber-reinforced thermoplastic "skin". In each case, the adhesive was cooled at a 1.5 mil film thickness onto one mating surface and the second non-adhesive coated mating surface was pressed onto the adhesive-coated surface and cured for 15 minutes at 180° F. Lap shear strength tests were performed on the resulting assemblies according to the procedure of ASTM D-1002-72. The three specimens (1" overlap) were pulled to destruction at a mean value of 525 psi. All three samples gave what are known as 100% fiber tearing bonds. The results obtained were all the more remarkable as Phase-Alpha SMC is known to be a stock notoriously difficult to bond.

It is claimed:

1. A structural adhesive composition comprising:
   A. at least one organic polyisocyanate compound having at least two isocyanate groups;
   B. a polyol comprising at least one polymeric polyol comprising a graft copolymer of a poly(alkylene oxide) polyol and a vinyl monomer selected from acrylonitrile or a mixture of acrylonitrile and styrene, said polyisocyanate being present in an amount sufficient to provide an NCO:OH ratio of at least 1 with respect to the hydroxyl groups; and
   C. a latent catalyst for the reaction of the isocyanate groups of said polyisocyanite and hydroxyl groups of said polyol.

2. A structural adhesive composition according to claim 1 wherein the polymeric polyol comprises a graft copolymer of a poly(alkylene oxide) polyol and acrylonitrile.

3. A structural adhesive composition according to claim 2 wherein the poly(alkylene oxide) polyol is poly(ethylene oxide-propylene oxide copolymer) polyol.

4. A structural adhesive according to claim 1 wherein the polymeric polyol is a graft copolymer of poly(alkylkene oxide) polyol and a mixture of acrylonitrile and styrene.

5. A structural adhesive composition according to claim 1 wherein the polyisocyanate is an aromatic polyisocyanate.

6. A structural adhesive composition according to claim 1 wherein the aromatic polyisocyanate is poly(methylene diphenyldiisocyanate).

7. A structural adhesive composition according to claim 1 wherein the latent catalyst is selected from the group consisting of acid-blocked or phenol-blocked salts of bicyclic amidine compounds having the structure:

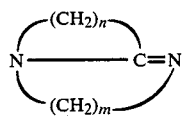

wherein m and n can be the same or different and each is an integer from 3 to 5.

8. An adhesive composition according to claim 7 wherein the salts are selected from phenol salts, mineral acid salts, sulfonic acid salts and carboxylic acid salts.

9. An adhesive composition according to claim 7 wherein the bicylic amidine is 1,8-diaza-bicyclo[5.4.0] undec-7-ene.

10. An adhesive composition according to claim 8 wherein the salt is 1,8-diaza-bicyclo[5.4.0] undec-7-ene salt of p-toluene sulfonic acid.

11. A bonded assembly comprising a sheet molded compound bonded to a fiberglass-reinforced thermoplastic with the adhesive composition of claim 1 so as to form a laminate.

12. A bonded assembly according to claim 11 wherein the adhesive composition is that of claim 2.

13. A bonded assembly according to claim 11 wherein the adhesive composition is that of claim 6.

14. A bonded assembly according to claim 11 wherein the adhesive composition is that of claim 7.

15. A bonded assembly according to claim 11 wherein the adhesive composition is that of claim 9.

16. A bonded assembly according to claim 11 wherein the adhesive composition is that of claim 10.

* * * * *